(12) United States Patent
Hanada et al.

(10) Patent No.: US 11,040,396 B2
(45) Date of Patent: Jun. 22, 2021

(54) METHOD FOR METAL POWDER INJECTION MOLDING

(71) Applicants: OSAKA YAKIN KOGYO CO., LTD., Osaka (JP); MITSUBISHI HEAVY INDUSTRIES AERO ENGINES, LTD., Aichi (JP)

(72) Inventors: Tadayuki Hanada, Aichi (JP); Kenji Suzuki, Tokyo (JP); Shuntaro Terauchi, Osaka (JP); Hisashi Kitagaki, Osaka (JP); Kazuki Hanami, Osaka (JP)

(73) Assignees: OSAKA YAKIN KOGYO CO., LTD., Osaka (JP); MITSUBISHI HEAVY INDUSTRIES AERO ENGINES, LTD., Aichi (JP)

( * ) Notice: Subject to any disclaimer, the term of this patent is extended or adjusted under 35 U.S.C. 154(b) by 219 days.

(21) Appl. No.: 16/462,400

(22) PCT Filed: Nov. 22, 2017

(86) PCT No.: PCT/JP2017/042039
§ 371 (c)(1),
(2) Date: May 20, 2019

(87) PCT Pub. No.: WO2018/097188
PCT Pub. Date: May 31, 2018

(65) Prior Publication Data
US 2019/0299294 A1 Oct. 3, 2019

(30) Foreign Application Priority Data
Nov. 22, 2016 (JP) .............................. JP2016-226928

(51) Int. Cl.
*B22F 3/10* (2006.01)
*B22F 3/14* (2006.01)
(Continued)

(52) U.S. Cl.
CPC ................ *B22F 3/14* (2013.01); *B22F 3/225* (2013.01); *B22F 5/04* (2013.01); *B22F 7/062* (2013.01);
(Continued)

(58) Field of Classification Search
CPC ............ B29C 45/0003; B29C 45/0089; B29C 45/14467; B29C 45/1635; B29C 45/14;
(Continued)

(56) References Cited

U.S. PATENT DOCUMENTS

| 6,551,551 | B1 * | 4/2003 | Gegel ..................... B22F 3/225 228/194 |
| 8,685,314 | B2 * | 4/2014 | Tuppen ................... B22F 3/093 419/8 |

(Continued)

FOREIGN PATENT DOCUMENTS

| JP | H04341508 A | 11/1992 |
| JP | 11302708 A | 11/1999 |

(Continued)

OTHER PUBLICATIONS

International Search Report and Written Opinion for International Application No. PCT/JP2017/042039 dated Dec. 26, 2017; 12pp.

*Primary Examiner* — Thu Khanh T Nguyen
(74) *Attorney, Agent, or Firm* — Hauptman Ham, LLP

(57) ABSTRACT

A method for metal powder injection molding includes injecting a first metal powder of a TiAl-based intermetallic compound into a mold, and molding the first metal powder through use of an injection molding machine; injecting a second metal powder of a TiAl-based intermetallic compound having a same constituent as the first metal powder and having a different average particle diameter from the first metal powder into a mold, and molding the second metal powder through use of the injection molding machine;

(Continued)

and sintering molded articles obtained by molding the first metal powder and the second metal powder, and producing a mixed sintered compact in which a first sintered compact of the molded article obtained by molding the first metal powder and a second sintered compact of the molded article obtained by molding the second metal powder are integrated.

6 Claims, 13 Drawing Sheets

(51) Int. Cl.
    *B29C 45/07*     (2006.01)
    *B29C 45/76*     (2006.01)
    *B22F 3/22*     (2006.01)
    *B22F 5/04*     (2006.01)
    *C22C 1/04*     (2006.01)
    *B22F 7/06*     (2006.01)
    *B22F 1/00*     (2006.01)

(52) U.S. Cl.
    CPC .......... *B29C 45/076* (2013.01); *B29C 45/762* (2013.01); *C22C 1/0491* (2013.01); *B22F 1/0011* (2013.01); *B22F 7/06* (2013.01); *B22F 2301/052* (2013.01); *B22F 2301/205* (2013.01); *B22F 2999/00* (2013.01)

(58) Field of Classification Search
    CPC ..... B29C 45/16; B29C 45/1693; B22F 3/225; B22F 3/1021; B22F 2301/052; B22F 2301/205
    See application file for complete search history.

(56) References Cited

U.S. PATENT DOCUMENTS

| | | | | |
|---|---|---|---|---|
| 10,159,574 | B2 * | 12/2018 | Julien | ..................... B22F 3/225 |
| 2002/0079613 | A1 * | 6/2002 | Benefield | ................ B29C 45/16 |
| | | | | 264/255 |
| 2009/0022615 | A1 * | 1/2009 | Entezarian | ............. B29C 45/16 |
| | | | | 419/38 |
| 2018/0055641 | A1 * | 3/2018 | Jones | .................... B22F 3/1109 |

FOREIGN PATENT DOCUMENTS

| | | | |
|---|---|---|---|
| JP | 2001140002 A | 5/2001 |
| JP | 2010084165 A | 4/2010 |
| JP | 2013170295 A | 9/2013 |
| WO | 2006003703 A1 | 1/2006 |

* cited by examiner

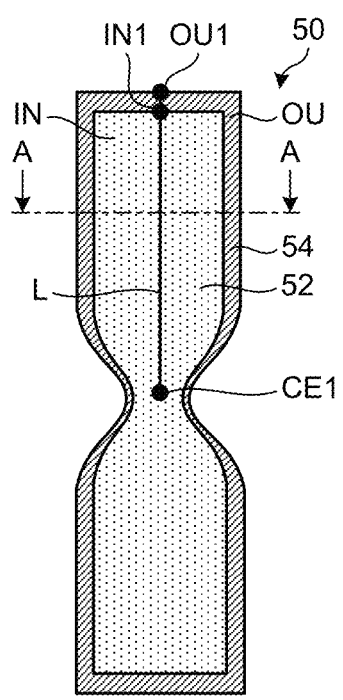

METHOD FOR METAL POWDER INJECTION MOLDING

RELATED APPLICATIONS

The present application is a National Phase of International Application Number PCT/JP2017/042039 filed Nov. 22, 2017 and claims priority to Japanese Application Number 2016-226928 filed Nov. 22, 2016.

FIELD

The present invention relates to a method for metal powder injection molding.

BACKGROUND

Metal injection molding (MIM) is a manufacturing process for manufacturing a metal sintered compact by mixing a metal powder with a binder, injecting the mixture into a mold and molding the mixture to obtain a molded article, and degreasing and sintering the molded article. Metal powder injection molding has recently come into wide use because products with different shapes can be manufactured without machining such as cutting.

Furthermore, as disclosed in Patent Literature 1, for example, having been used in the field of powder metallurgy is a technology for manufacturing a metal sintered compact endowed with functionally graded characteristics by sintering metal powders having metallic compositions that are different from each other.

CITATION LIST

Patent Literature

Patent Literature 1: Japanese Unexamined Patent Application Publication No. 4-341508

SUMMARY

Technical Problem

However, when metal powders with different metallic compositions are sintered, it sometimes becomes difficult to manufacture a sintered compact sufficiently achieving targeted functionally graded characteristics, since, for example, bonding on the interface between the two may become unstable. Furthermore, intermetallic compounds, such as TiAl, can only sintered at a temperature within a limited range. Therefore, only with large-sized particles, the shape of the product may be lost easily as the temperature is increased in the process of sintering, and it may become difficult to manufacture a sintered compact with a low rigidity.

Therefore, an object of the present invention is to provide a method for metal powder injection molding capable of manufacturing a metal sintered compact endowed with functionally graded characteristics appropriately.

Solution to Problem

To solve the problems described above and achieve the object, a method for metal powder injection molding according to the present disclosure includes a first injection molding step of injecting a first metal powder into a mold, and molding the first metal powder through use of an injection molding machine; a second injection molding step of injecting a second metal powder having a same constituent as the first metal powder and having a different average particle diameter from the first metal powder into a mold, and molding the second metal powder through use of the injection molding machine; and a sintering step of sintering molded articles obtained by the molding at the first injection molding step and the second injection molding step, and producing a mixed sintered compact in which a sintered compact of the molded article obtained by the molding at the first injection molding step and a sintered compact of the molded article obtained by the molding at the second injection molding step are integrated.

Because the first metal powder and the second metal powder have the same constituents, it is possible to suppress a reduction in the stability of the boding on the interface between the metal powders. Furthermore, because the first metal powder and the second metal powder have average particle diameters that are different from each other, functionally graded characteristics are provided. Therefore, with this method for metal powder injection molding, a metal sintered compact endowed with functionally graded characteristics can be manufactured appropriately.

In the method for metal powder injection molding, it is preferable that the second injection molding step is performed after the first injection molding step. With this method for metal powder injection molding, the metal powders having different average particle diameters are injection-molded at separate steps. Therefore, a metal sintered compact endowed with functionally graded characteristics can be easily manufactured.

In the method for metal powder injection molding, it is preferable that the first injection molding step includes taking the molded article obtained by the molding out of the mold, and the second injection molding step includes inserting the molded article obtained by the molding at the first injection molding step into a mold that is different from the mold used at the first injection molding step, and injecting the second metal powder onto a surface of the molded article in the different mold. With this method for metal powder injection molding, a molded article of the second metal powder is molded on the surface of the molded article of the first metal powder. Therefore, a metal sintered compact endowed with functionally graded characteristics can be easily manufactured.

In the method for metal powder injection molding, it is preferable that the second injection molding step is performed simultaneously with the first injection molding step. With this method for metal powder injection molding, the metal powders with different average particle diameters are injection-molded simultaneously. Therefore, the manufacturing process can be simplified.

In the method for metal powder injection molding, it is preferable that an average particle diameter of the second metal powder is smaller than an average particle diameter of the first metal powder, and the second injection molding step included injecting the second metal powder around the molded article obtained by the molding at the first injection molding step. This sintered compact includes an inner region that is the sinter of the first metal powder having a larger average particle diameter, and an outer region that is the sinter of the second metal powder having a smaller average particle diameter, or includes an inner region that is the sinter of the first metal powder having a larger average particle diameter, and an outer region that is the sinter of the second metal powder having a smaller average particle diameter. Therefore, with the method for metal powder injection molding, it is possible to manufacture a sintered compact in which reductions in the creep strength and the fatigue strength are suppressed. Furthermore, in the process of temperature increase during the sintering, sintering of the second metal powder with a smaller average particle diameter proceeds at an earlier stage. In this manner, the shape of the inner region is maintained by the outer surface portion (outer portion) while the sintering of the inner region takes place. Therefore, it is possible to prevent a loss of the shape.

In the method for metal powder injection molding, it is preferable that the second injection molding step is performed prior to the first injection molding step. With this method for metal powder injection molding, the metal powders having different average particle diameters are injection-molded at separate steps. Therefore, a metal sintered compact endowed with functionally graded characteristics can be easily manufactured.

Advantageous Effects of Invention

According to the present invention, a metal sintered compact endowed with functionally graded characteristics can be manufactured appropriately.

BRIEF DESCRIPTION OF DRAWINGS

FIG. 5 is an explanatory schematic for explaining a mixed sintered compact.

DESCRIPTION OF EMBODIMENTS

Some preferred embodiments of the present invention will now be explained in detail with reference to the appended drawings. These embodiments are, however, not intended to limit the present invention in any way. Furthermore, when the embodiment is described in plurality, the present invention also encompasses any combinations of the embodiments.

First Embodiment

Figure 1:
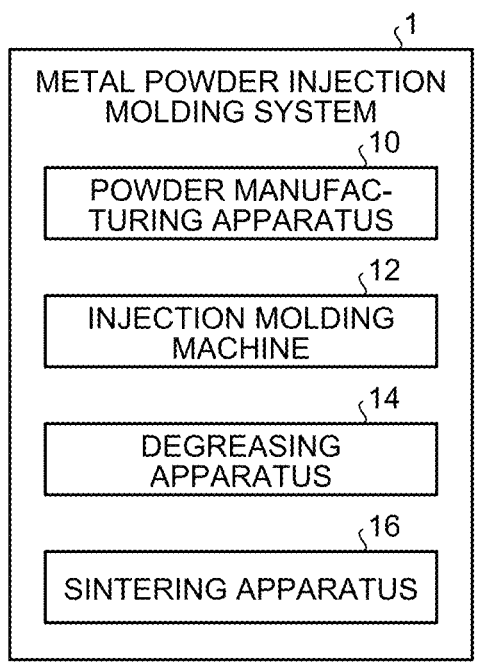
FIG. 1 is a block diagram illustrating a configuration of a metal powder injection molding system according to a first embodiment.

FIG. 1 is a block diagram illustrating a configuration of a metal powder injection molding system according to a first embodiment. This metal powder injection molding system 1 according to the first embodiment is a system for executing a method for metal powder injection molding. As illustrated in FIG. 1, the metal powder injection molding system 1 includes a powder manufacturing apparatus 10, an injection molding machine 12, a degreasing apparatus 14, and a sintering apparatus 16. In the metal powder injection molding system 1, a sintered compact is manufactured by the powder manufacturing apparatus 10 manufacturing a metal powder having a predetermined average particle diameter, by the injection molding machine 12 injection molding the metal powder with a binder, the degreasing apparatus 14 degreasing the binder, and the sintering apparatus 16 sintering the degreased molded article.

Figure 2:
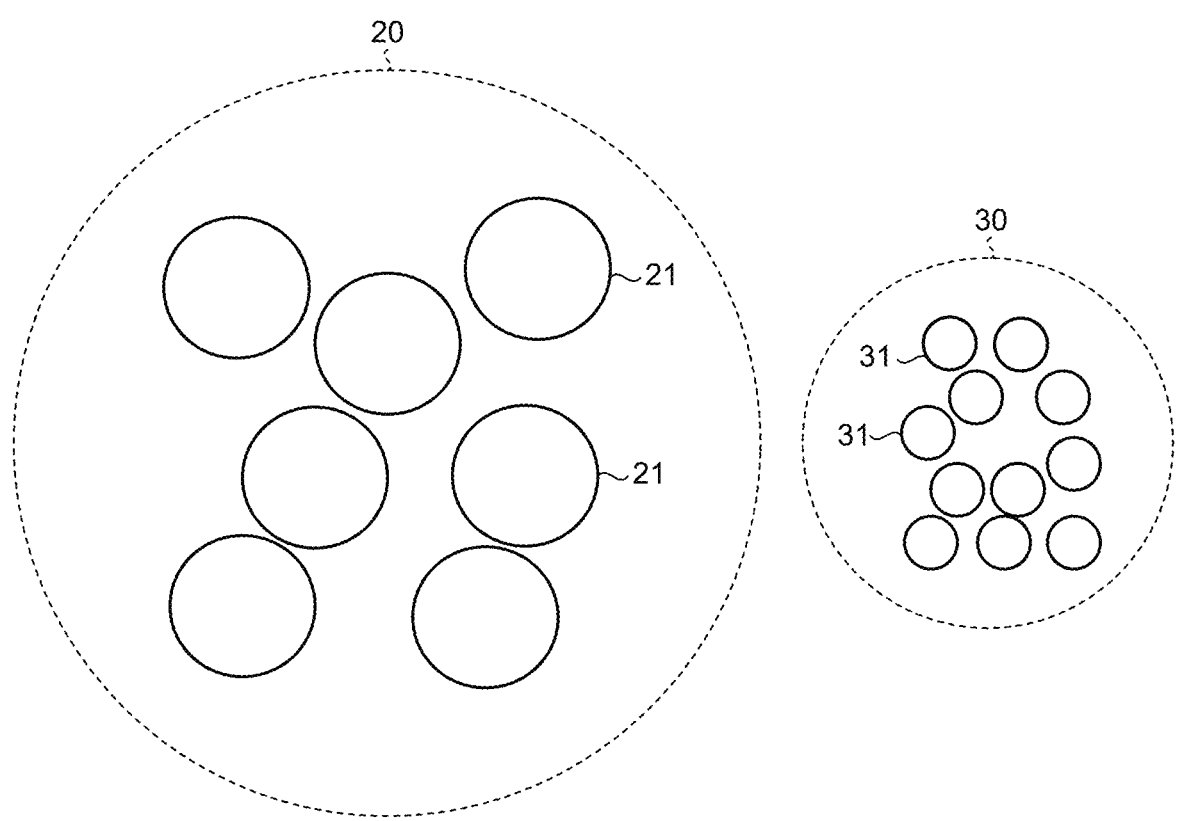
FIG. 2 is an explanatory schematic of a first metal powder and a second metal powder.

The powder manufacturing apparatus 10 manufactures a first metal powder 20 and a second metal powder 30. FIG. 2 is an explanatory schematic of the first metal powder and the second metal powder. As illustrated in FIG. 2, the first metal powder 20 is a collection of a plurality of first metal particles 21 resultant of collecting the first metal particles 21 that are metallic particles (powder). The first metal particles 21 are powder of a TiAl-based intermetallic compound, but without limitation thereto, the powder may have any metallic composition, as long as the compound is metallic. The powder manufacturing apparatus 10 creates the first metal powder 20 by collecting the first metal particles 21 with similar particle diameters using classification, for example. The particle diameters of the first metal particles 21 included in the first metal powder 20 are within the range equal to or greater than 30 μm and equal to or smaller than 150 μm, for example. Preferably, an average particle diameter D1 that is an average of the particle diameters of all of the first metal particles 21 included in the first metal powder 20 falls within a range equal to or greater than 45 μm and equal to or smaller than 125 μm, for example.

The second metal powder 30 is a collection of a plurality of second metal particles 31 resultant of collecting the second metal particles 31 that are metallic particles (powder). The second metal particles 31 are made of a metal having the same constituents as those of the first metal particles 21. A metal having the same constituents means a metal with the same metallic composition, when a very small amount of materials, such as impurities, included in the metal are excluded. The powder manufacturing apparatus 10 creates the second metal powder 30 with a smaller average particle diameter than that of the first metal powder 20, by collecting the second metal particles 31 with similar particle diameter using classification, for example. The particle diameters of the second metal particles 31 included in the second metal powder 30 are within the range equal to or greater than 1 μm and equal to or smaller than 45 μm, for example. Preferably, an average particle diameter D2 that is an average of the particle diameters of all of the second metal particles 31 included in the second metal powder 30 falls within a range equal to or greater than 5 μm and equal to or smaller than 30 μm, for example. In other words, for example, the average particle diameter D2 of the second metal powder 30 is equal to or greater than 1.5 times the average particle diameter D1 of the first metal powder 20, and equal to or smaller than 25 times the average particle diameter D1. The particle diameters and the ratio between these average diameters are not limited thereto, as long as the second metal powder 30 has an average particle diameter D2 that is different from the average particle diameter D1 of the first metal powder 20. Various methods are available as ways to measure the average particle diameters, but the average particle diameters used in the embodiment are those acquired based on a granularity distribution resultant of a laser diffraction and scattering analysis. With this method, in principle, the average particle diameters are measured using volume distributions. An average particle diameter herein is the mean value in a granularity distribution acquired by such a laser diffraction and scattering analysis. Measurement instruments for measuring the average particle diameters D1, D2 do not need to be the same, but it is preferable for the measurement principle and the measurement method used by such measurement instruments to be the same.

In this embodiment, the average particle diameters are measured using SALD-2300, which is a laser diffraction particle size distribution analyzer manufactured by SHIMADZU CORPORATION, but it should be needless to say that this measurement may be made using any analyzer using any other approach or manufactured by any other manufacturer. SALD-2300 measures an average particle diameter d in the following manner. To begin with, the range of particle diameters of particles that are the target of measurement is divided into n classes of particle diameters. The largest particle diameter is denoted by di, and the smallest particle diameter is denoted by $d_{n+1}$. Each of the divided particle diameter classes is expressed as [dj, dj+1] (j=1, 2, ..., n). These classes are equal divisions on a logarithmic scale. In other words, each of the divided particle diameter classes has the same value width (difference between dj and dj+1) on the logarithmic scale. Based on the logarithmic scale, a representative particle diameter in each of the particle diameter classes can be as expressed by the following Equation (1):

$$(\log_{10} d_j + \log_{10} d_{j+1})/2 \quad (1)$$

Denoting a relative amount of particles (difference percent) corresponding to a particle diameter class [dj, dj+1] as $q_j$ ((j=1, 2, ..., n) with respect to 100 percent that is the total amount of particles belonging to all of the classes, an average μ of the particle diameters on the logarithmic scale is calculated as the following Equation (2).

$$\mu = \frac{1}{100} \sum_{j=1}^{n} q_j \left( \frac{\log_{10} d_j + \log_{10} d_{j+1}}{2} \right) \quad (2)$$

The average particle diameter d is then calculated as 10 raised to a power of μ, as expressed in the following Equation (3):

$$d = 10\mu \quad (3)$$

The injection molding machine 12 illustrated in FIG. 1 is a machine for performing metal injection molding (MIM). The injection molding machine 12 injects the first metal powder 20 mixed with a binder and the second metal powder 30 mixed with a binder into a mold, and forms a molded article of the mixtures. The binder serves to bind the metal particles together, and is a resin with fluidity.

Figure 3:
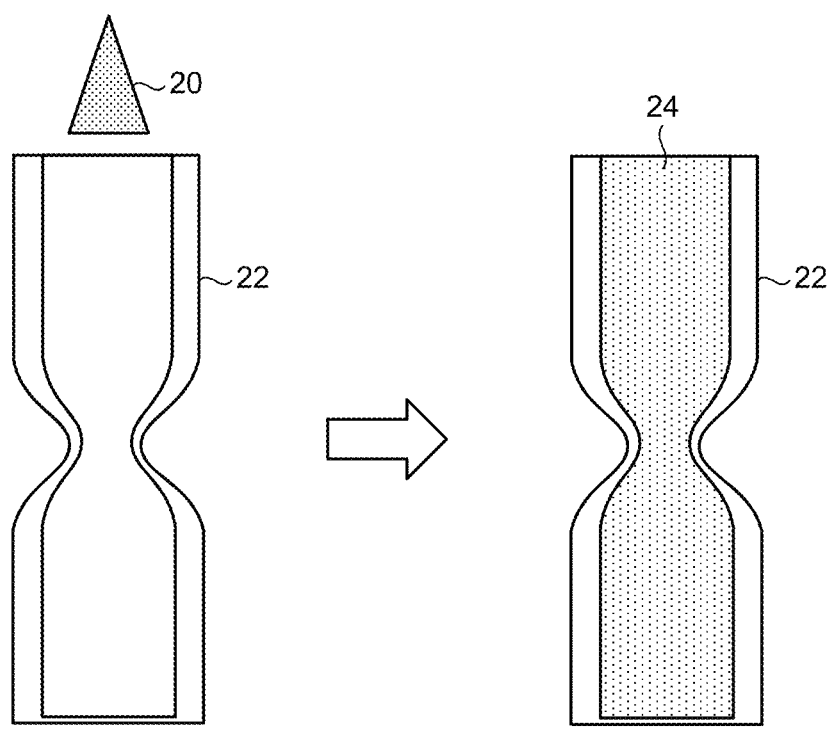
FIG. 3 is an explanatory schematic for explaining injection molding of the first metal powder, achieved by an injection molding machine according to the first embodiment.
Figure 4:
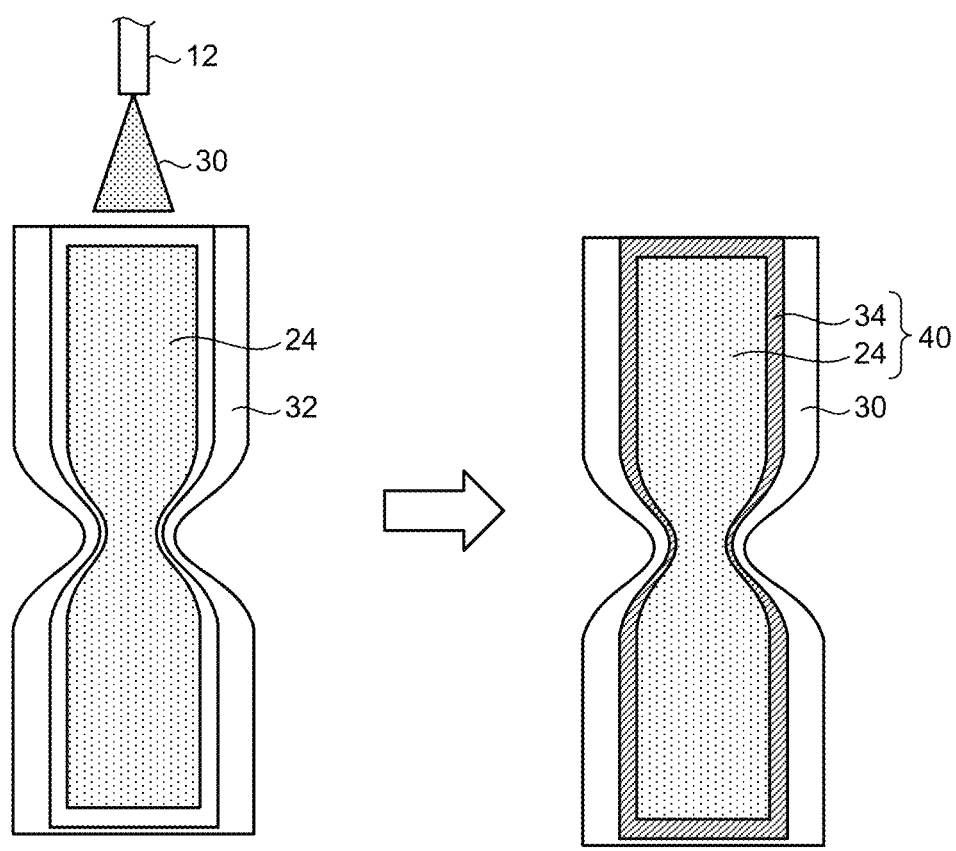
FIG. 4 is an explanatory schematic for explaining injection molding of the second metal powder, achieved by the injection molding machine according to the first embodiment.

The injection molding machine 12 according to the first embodiment injects the first metal powder 20 and the second metal powder 30 having different average particle diameters at different timings. FIG. 3 is an explanatory schematic for explaining the injection molding of the first metal powder, achieved by the injection molding machine according to the first embodiment. FIG. 4 is an explanatory schematic for explaining the injection molding of the second metal powder, achieved by the injection molding machine according to the first embodiment.

As illustrated in FIG. 3, to begin with, the injection molding machine 12 injects the first metal powder 20 mixed with a binder into a first mold 22 that is a mold for molding, and forms a first molded article 24. The first molded article 24 is a molded article of the first metal powder 20. The first molded article 24 is then taken out from the first mold 22. Because the first molded article 24 contains the binder, the shape of the first molded article 24 is kept in the shape defined by the first mold 22 even after the first molded article 24 is removed from the first mold 22.

As illustrated in FIG. 4, the first molded article 24 taken out from the first mold 22 is inserted into a second mold 32. The second mold 32 is a mold having a different shape as the first mold 22, but is larger than the first mold 22, in this embodiment. The injection molding machine 12 injects the second metal powder 30 mixed with a binder onto the surface of the first molded article 24 in the second mold 32, and forms a second molded article 34 on the surface of the first molded article 24. The second molded article 34 is a molded article of the second metal powder 30. Specifically, the injection molding machine 12 injects the second metal powder 30 around the first molded article 24 in the second mold 32, and forms the second molded article 34 around the first molded article 24. The first molded article 24 and the second molded article 34 together form a mixed molded article 40 that is an integrated molded article. In other words, the first molded article 24 makes up a part of the mixed molded article 40, and the second molded article 34 makes up the other part. Included in the mixed molded article 40 is only a metal powder having the same constituents as those of the first metal powder 20, and no metal powder with any constituent other than those of the first metal powder 20 are included. In FIG. 4, the mixed molded article 40 has a neck at the center, but the shape can be set to any shape depending on the shape of the mold, for example. Furthermore, in the explanation above, the first molded article 24 is inserted into the second mold 32 that is separate from the first mold 22 before the second metal powder 30 is injected, but it is also possible to maintain the molded article inside of the same mold as that to which the first metal powder 20 is injected, that is, inside of the first mold 22 in this example, and to cause the injection molding machine 12 to inject the second metal powder 30, and to form the mixed molded article 40.

The mixed molded article 40 is then taken out of the second mold 32, and is degreased by the degreasing apparatus 14 illustrated in FIG. 1. The degreasing apparatus 14 accepts the mixed molded article 40 taken out from the second mold 32, and removes (degreases) the internal binder from the mixed molded article 40 into an aggregation of metal powders. Mainly used as the degreasing method is thermal degreasing, and the degreasing temperature is a temperature equal to or higher than the temperature at which the binder evaporates or becomes thermally decomposed. However, any degreasing method other than thermal degreasing may be used, and, in such a case, the example explained above does not apply thereto.

The sintering apparatus 16 illustrated in FIG. 1 accepts the degreased mixed molded article 40, and sinters the mixed molded article 40 by heating the internal thereof to a sintering temperature, to produce a mixed sintered compact 50 that is a sintered compact. The sintering temperature herein is a temperature allowing the first metal powder 20 and the second metal powder 30 to sinter, and is between 1100 degrees Celsius and 1600 degrees Celsius, for example. The sintering apparatus 16 promotes the sintering by keeping the internal temperature to a sintering temperature over a predetermined time period (e.g., one hour). The sintering apparatus 16 may be an apparatus that is separate from the degreasing apparatus 14, or the same apparatus as the degreasing apparatus 14. When the sintering apparatus 16 is the same apparatus as the degreasing apparatus 14, the temperature is raised to the sintering temperature successively, without decreasing the temperature from the degreasing temperature.

Figure 6A:
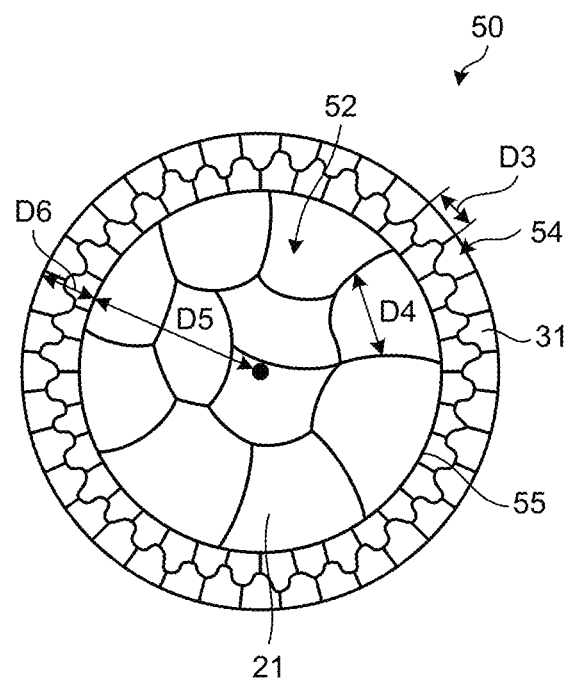
FIG. 6A is an explanatory schematic for explaining a mixed sintered compact.

FIGS. 5 and 6A are explanatory schematics for explaining the mixed sintered compact. As illustrated in FIG. 5, the mixed sintered compact 50 has a first sintered portion 52 and a second sintered portion 54. The first sintered portion 52 is a region corresponding to the sinter of the first molded article 24 included in the mixed molded article 40. The second sintered portion 54 is a region corresponding to the sinter of the second molded article 34 included in the mixed molded article 40. In other words, the mixed sintered compact 50 is a sintered compact that is an integration of the sintered compact of the first molded article 24 made with the first metal powder 20 (the first sintered portion 52) and the sintered compact of the second molded article 34 made with the second metal powder 30 (the second sintered portion 54). In this embodiment, the second sintered portion 54 is formed to cover the outer periphery of the first sintered portion 52, but the shape of the first sintered portion 52 and the shape of the second sintered portion 54 are determined by the shapes of the first molded article 24 and the second molded article 34, respectively.

FIG. 6A is an enlarged sectional view of the mixed sintered compact 50 in a view along the line A illustrated in FIG. 5. As illustrated in FIG. 6A, the first sintered portion 52 is a region where the first molded article 24 is, that is, the first metal particles 21 are sintered into a binding body of a plurality of crystal grains. The second sintered portion 54 is a region where the second molded article 34 is, that is, the second metal particles 31 are sintered into a binding body of a plurality of crystal grains. The first metal particles 21 in the first sintered portion 52 are sintered with the second metal particles 31 in the second sintered portion 54 via a boundary 55 surrounding the first sintered portion 52. In other words, the mixed sintered compact 50 includes a region corresponding to the sinter of the first metal particles 21 having a larger average particle diameter (the first sintered portion 52) on the inner side of the boundary 55, and a region corresponding to the sinter of the second metal particles 31 having a smaller average particle diameter (the second sintered portion 54) on the outer side of the boundary 55.

To explain further, in the mixed sintered compact 50, a diameter D4 of a sintered crystal grain in the first sintered portion 52, which is a region on the center side, (the diameter D4 being dependent on the particle diameter of the sintered second metal particle 31) is larger than a diameter D3 of a sintered crystal grain in the second sintered portion 54, which is a region on the outer side of the first sintered portion 52 (the diameter D3 being dependent on the particle diameter of the sintered first metal particle 21). Furthermore, a distance D5 between the center of the mixed sintered compact 50 and the outer periphery of the second sintered portion 54 (the boundary 55) is equal to or greater than 0.5 times a distance D6 between the outer periphery of the second sintered portion 54 (the boundary 55) and the outer periphery of the first sintered portion 52 (the outer periphery of the mixed sintered compact 50), and equal to or smaller than 60 times the distance D6.

In the explanation hereunder, the length from the outer periphery of the mixed sintered compact 50 and the center of the mixed sintered compact 50 will be referred to as a sectional length L. The region extending from the outer periphery of the mixed sintered compact 50 toward the center by a given distance will be referred to as an outer region OU. The region on the inner side (the center side) of the outer region will be referred to as an inner region IN. The diameters of the sintered crystal grains in the outer region OU are smaller than those of the sintered crystal grains in the inner region IN. In such a case, it is preferable for the outer region OU to be a region extending from the outer periphery of the mixed sintered compact 50 toward the center by a distance equal to or higher than 1.6 percent and equal to or lower than 67 percent of the sectional length L. Furthermore, it is preferable for the inner region IN to be a region extending from the center of the mixed sintered compact 50 toward the outer periphery by a distance equal to or more than 33 percent and equal to or less than 98.4 percent of the sectional length L.

In the explanation hereunder, a position on the outer periphery of the mixed sintered compact 50 will be referred to as an outer periphery position OU1. The position of the center of the mixed sintered compact 50 will be referred to as a center position CE. A position on the boundary between the outer region OU and the inner region will be referred as a boundary position IN1. As illustrated in FIG. 5, the outer region OU corresponds to a region including a line segment between the outer periphery position OU1 and the boundary position IN1, and the inner region IN corresponds to a region including a line segment between the boundary position IN1 and the center position CE1, along a line segment extending from the outer periphery position OU1, passing through the boundary position IN1, and connecting to the center position CE1 (the sectional length L) in the mixed sintered compact 50.

Figure 6B:
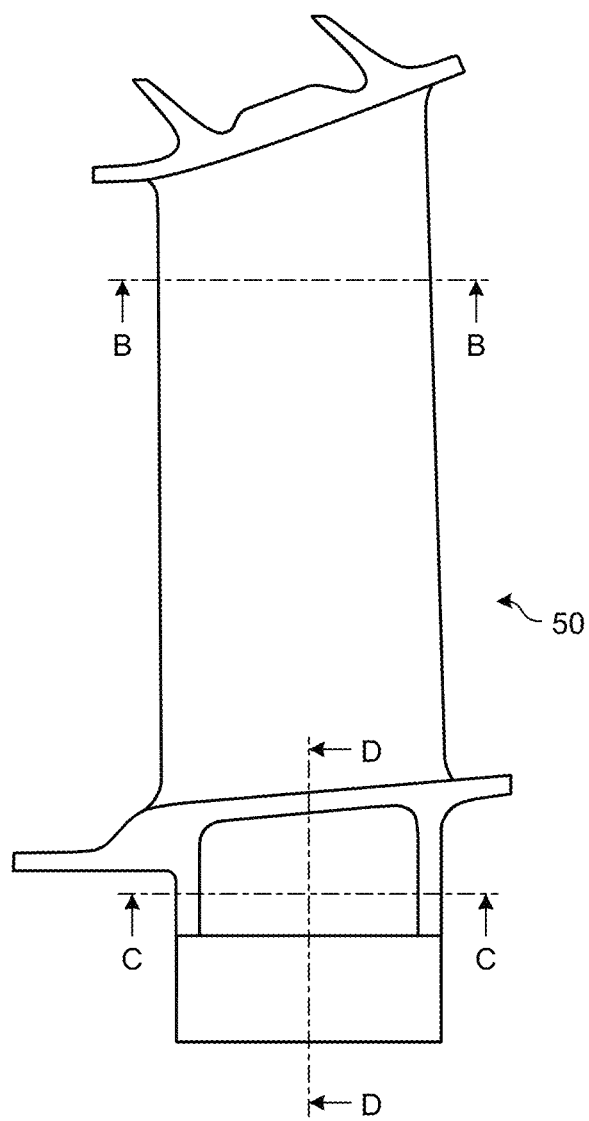
FIG. 6B is a schematic illustrating another example of an outer region and an inner region.
Figure 6C:
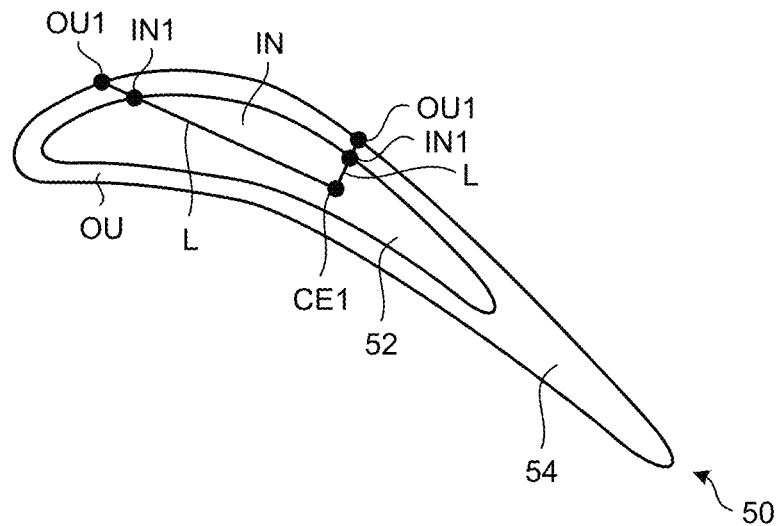
FIG. 6C is a schematic illustrating the other example of the outer region and the inner region.
Figure 6D:
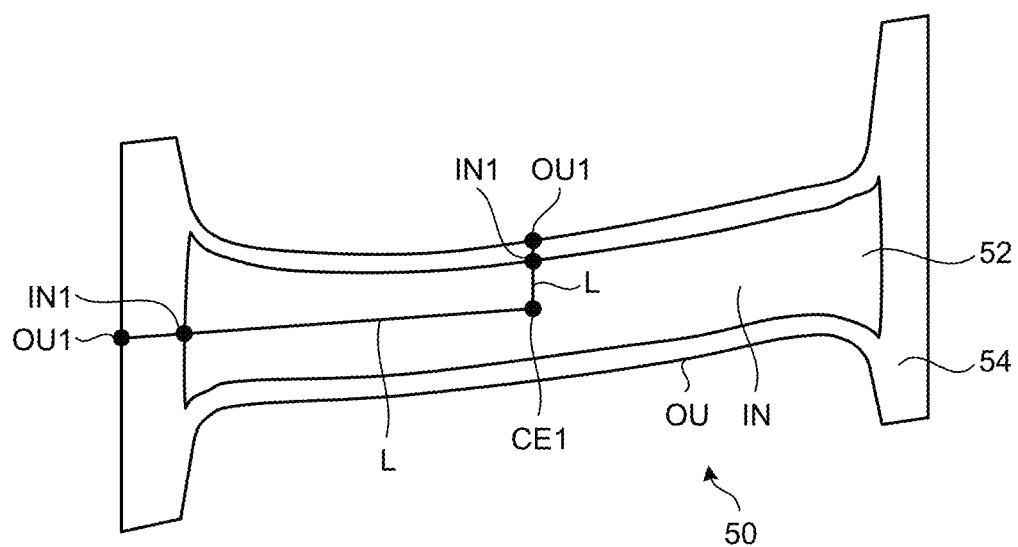
FIG. 6D is a schematic illustrating the other example of the outer region and the inner region.
Figure 6E:
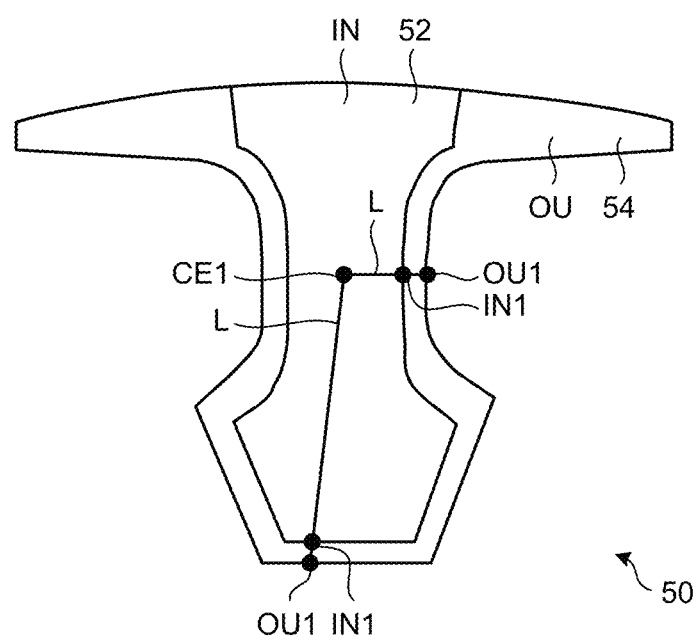
FIG. 6E is a schematic illustrating the other example of the outer region and the inner region.

FIG. 6B to FIG. 6E are schematics illustrating another example of the outer region and the inner region. FIG. 6B is a schematic illustrating one example of the shape of the mixed sintered compact 50. FIG. 6C is a sectional view across B-B in FIG. 6B. FIG. 6D is a sectional view across C-C in FIG. 6B. FIG. 6E is a sectional view across D-D in FIG. 6B. As illustrated in FIGS. 6C to 6E, the outer region OU corresponds to the region including a line segment between the outer periphery position OU1 and the boundary position IN1, and the inner region IN corresponds to a region including a line segment between the boundary position IN1 and center position CE1, along a line segment extending from the outer periphery position OU1, passing through the boundary position IN1, and connecting to the center position CE1 (the sectional length L) in the mixed sintered compact 5 having such a shape. In such a configuration, too, the diameters of the sintered crystal grains in the outer region OU (the second sintered portion 54) are smaller than those of the sintered crystal grains in the inner region IN (the first sintered portion 52).

Because the mixed sintered compact 50 is the sinter of the metal powders having the same constituents as the first metal powder 20, the internal metallic composition is constant across the entire mixed sintered compact 50. In other words, the mixed sintered compact 50 has a constant metallic composition across the first sintered portion 52 and the second sintered portion 54. The metallic composition herein is the amounts of metal constituents (e.g., the ratio of metal constituents with respect to one another, in units of weight percent, for example).

Figure 7:
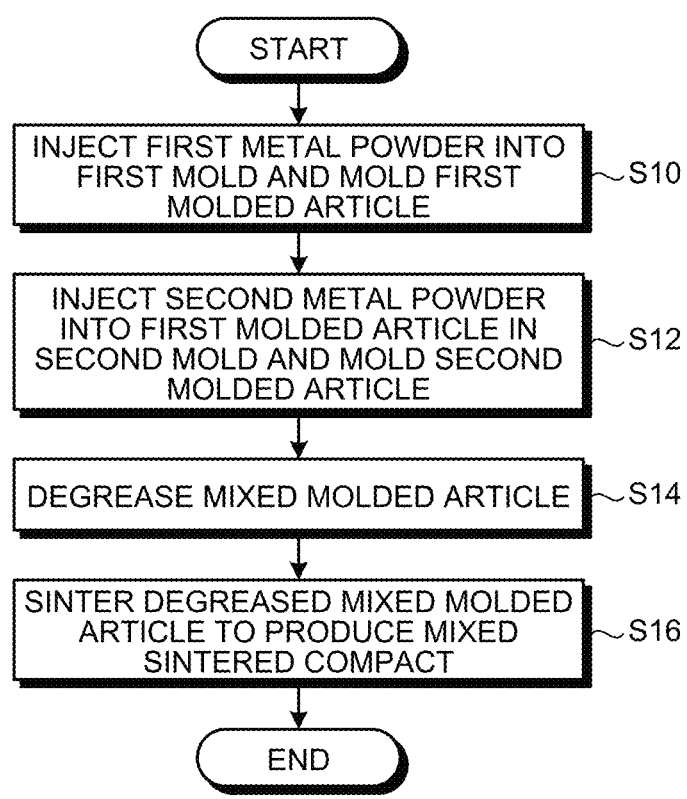
FIG. 7 is a flowchart for explaining a method for metal powder injection molding executed by the metal powder injection molding system according to the first embodiment.

The sequence of the method for metal powder injection molding, that is, the sequence by which the mixed sintered compact 50 is manufactured by the metal powder injection molding system 1 will now be explained. FIG. 7 is a flowchart for explaining the method for metal powder injection molding executed by the metal powder injection molding system according to the first embodiment.

As illustrated in FIG. 7, in the metal powder injection molding system 1, the injection molding machine 12 injects the first metal powder 20, with a binder added thereto, into the first mold 22, and forms the first molded article 24 (Step S10: first injection molding step). The first molded article 24 is then taken out of the first mold 22 by a worker or by an apparatus that is provided to the metal powder injection molding system 1. The first molded article 24 taken out of the first mold 22 is inserted into the second mold 32. In the metal powder injection molding system 1, then the injection molding machine 12 injects the second metal powder 30 with a binder added thereto, onto the first molded article 24 inside of the second mold 32, and forms the mixed molded article 40 (Step S12: second injection molding step). Specifically, the injection molding machine 12 forms the mixed molded article 40 by forming the second molded article 34 on the surface of the first molded article 24.

After the mixed molded article 40 is molded, in the metal powder injection molding system 1, the degreasing apparatus 14 degreases the mixed molded article 40 (Step S14), and the sintering apparatus 16 sinters the degreased mixed molded article 40, to produce the mixed sintered compact 50 (Step S16: sintering step). The sequence is then ended.

The mixed sintered compact 50 is resultant of injection molding and sintering the first metal powder 20 and the second metal powder 30 that are the metal powders having the same constituents. The first metal powder 20 and the second metal powder 30 have average particle diameters that are different from each other. Therefore, the mixed sintered compact 50 has different characteristics in a region corresponding to the first sintered portion 52 that is the sinter of the first metal powder 20 and a region corresponding to the second sintered portion 54 that is the sinter of the second metal powder 30. In other words, the mixed sintered compact 50 has functionally graded characteristics. Specifically, the first sintered portion 52 in the mixed sintered compact 50 is a region corresponding to the sinter of the first metal powder 20 having a larger average particle diameter. Because the first sintered portion 52 is present, a reduction of the creep strength in the mixed sintered compact 50 is suppressed. Furthermore, because the first metal powder 20 having a larger average particle diameter is used, an increase of the production cost can be suppressed. Furthermore, the second sintered portion 54 in the mixed sintered compact 50 is a region corresponding to the sinter of the second metal powder 30 having a smaller average particle diameter. Because the mixed sintered compact 50 has the second sintered portion 54, an increase in the surface coarseness can be suppressed, while suppressing a decrease in the fatigue strength at the same time.

Furthermore, the first metal powder 20 and the second metal powder 30 have the same constituents. Because the mixed sintered compact 50 is not the sinter of metal powders with different constituents, a reduction in the stability of the bonding on the interface between the metal powders can be suppressed. Therefore, with the metal powder injection molding system 1, a metal sintered compact endowed with functionally graded characteristics (the mixed sintered compact 50) can be manufactured appropriately.

As explained above, the method for metal powder injection molding according to the embodiment includes the first injection molding step, the second injection molding step, and the sintering step. At the first injection molding step, the injection molding machine 12 injects the first metal powder 20 into a mold, and molds the first metal powder 20. At the second injection molding step, the injection molding machine 12 injects the second metal powder 30 into a mold, and molds the second metal powder 30. The second metal powder 30 has the same constituents as the first metal powder 20, but has a different average particle diameter. At the sintering step, the molded article (the mixed molded article 40) molded at the first injection molding step and the second injection molding step is sintered, to produce the mixed sintered compact 50. The mixed sintered compact 50 is a sintered compact that is an integration of the sinter (the first sintered portion 52) of the molded article molded at the first injection molding step (the first molded article 24) and the sinter (the second sintered portion 54) of the molded article molded at the second injection molding step (the second molded article 34).

With the method for metal powder injection molding, because the first metal powder 20 and the second metal powder 30 having the same constituents and different average particle diameters are injection-molded, a metal sintered compact endowed with functionally graded characteristics (the mixed sintered compact 50) can be manufactured appropriately.

Furthermore, the second injection molding step is performed after the first injection molding step. With this method for metal powder injection molding, because the metal powders having different average particle diameters are injection-molded at separate steps, a metal sintered compact endowed with functionally graded characteristics (the mixed sintered compact 50) can be easily manufactured. The order in which the first injection molding step and the second injection molding step are performed is not limited thereto, and it is also possible to perform the second injection molding step before the first injection molding step, for example.

At the first injection molding step, the molded first molded article 24 is taken out of the mold (the first mold 22). At the second injection molding step, the mixed molded article 40 is molded by inserting the first molded article 24 into a mold (the second mold 32) that is different from that used at the first injection molding step, and the second metal powder 30 is injected onto the surface of the first molded article 24 inside of the second mold 32. With this method for metal powder injection molding, the metal powders having different average particle diameters are injection-molded at separate steps, and the second molded article 34 is molded on the surface of the first molded article 24. Therefore, a metal sintered compact endowed with functionally graded characteristics (the mixed sintered compact 50) can be easily manufactured.

Furthermore, the second metal powder 30 has a smaller average particle diameter than that of the first metal powder 20. At the second injection molding step, the second metal powder 30 is injected around the first molded article 24, and the mixed molded article 40 is molded. The mixed sintered compact 50 resultant of sintering the mixed molded article 40 includes an inner region (the first sintered portion 52) that is the sinter of the first metal powder 20 having a larger average particle diameter, and an outer region (the second sintered portion 54) that is the sinter of the second metal powder 30 having a smaller average particle diameter. Therefore, with the method for metal powder injection molding, it is possible to achieve the mixed sintered compact 50 in which the reductions in the creep strength and the fatigue strength are both suppressed. The second sintered portion 54 does not need to cover the first sintered portion 52 completely, as long as the second sintered portion 54 is provided around (at least a part of) the first sintered portion 52. Furthermore, as described above, the second metal powder 30 does not have to have a smaller average particle diameter than that of the first metal powder 20, as long as the second metal powder 30 has a different average particle diameter from that of the first metal powder 20. For example, the second metal powder 30 may have a larger average particle diameter than that of the first metal powder 20. In such a case, it is possible to achieve a sintered compact achieving a higher strength in the inner region that corresponds to the sinter of the first metal powder 20, and having a higher coarseness on the outer surface of the region that corresponds to the sinter of the second metal powder 30.

Figure 8:
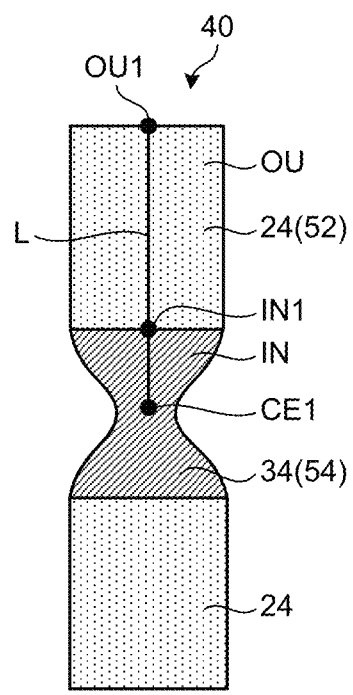
FIG. 8 is a schematic illustrating another example of a mixed molded article.

FIG. 8 is a schematic illustrating another example of the mixed molded article. In the explanation above, the mixed molded article 40 is explained to have the second molded article 34 molded around the first molded article 24, but, without limitation thereto, the first molded article 24 and the second molded article 34 may be provided with any shapes at any positions. For example, the first molded article 24 may be provided to both ends of the mixed molded article 40, and the second molded article 34 may be provided at the center, as illustrated in FIG. 8. Such a mixed sintered compact 50 has the first sintered portion 52 on each end, and the second sintered portion 54 at the center. Furthermore, in the mixed sintered compact 50 illustrated in FIG. 8, the outer region OU corresponds to a region including a line segment between the outer periphery position OU1 and the boundary position IN1, and the inner region IN corresponds to a region including a line segment between the boundary position IN1 and the center position CE1, along a line segment (sectional length L) extended from the outer periphery position OU1 on one end of the axial direction, passing through the boundary position IN1, and connecting to the center position CE1. As illustrated in FIG. 8, the outer region OU does not necessarily need to cover the inner region IN completely, as long as the outer region OU is provided around (at least a part of) the inner region IN. In the example illustrated in FIG. 8, the diameters of the sintered crystal grains in the outer region OU (the first sintered portion 52) are set smaller than those in the inner region IN (the second sintered portion 54).

Furthermore, the mixed molded article 40 is resultant of injection molding the first metal powder 20 and the second metal powder 30, but may also include a metal powder having another average particle diameter. In other words, the mixed sintered compact 50 may include a region resultant of sintering a metal powder having another average particle diameter. The metal powder has, however, the same constituents as the first metal powder 20. In other words, the mixed sintered compact 50 may be any sintered compact as long as the sintered compact have a plurality of regions, and the metal powders sintered in the respective regions have different average particle diameters and the same constitu-ents. The number of regions, that is, the number of types of metal powders to be sintered may be any number.

Second Embodiment

A second embodiment will now be explained. The metal powder injection molding system 1 according to the second embodiment is different from that according to the first embodiment in that the first molded article 24 and the second molded article 34 are molded simultaneously. In the second embodiment, explanations of parts having the same configurations as those in the first embodiment will be omitted.

Figure 9:
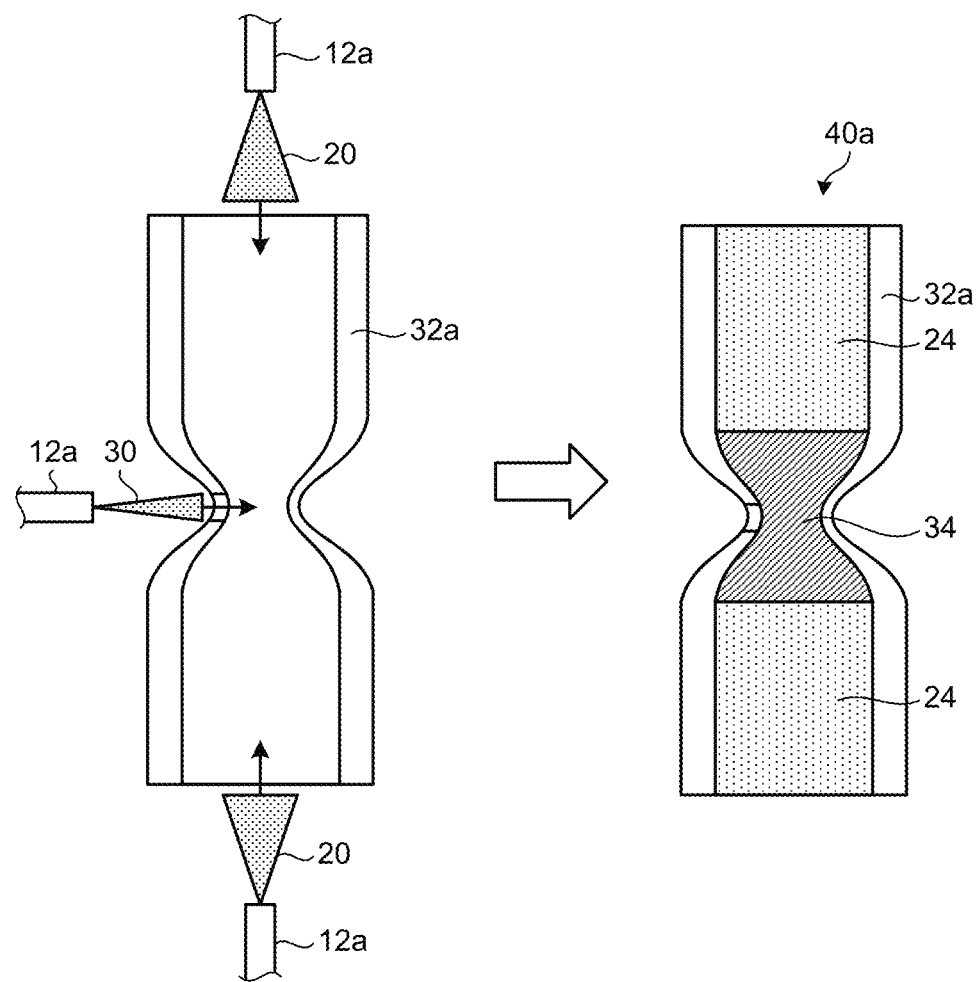
FIG. 9 is an explanatory schematic for explaining injection molding of the first metal powder and the second metal powder, achieved by an injection molding machine according to a second embodiment.

FIG. 9 is an explanatory schematic for explaining injection molding of the first metal powder and the second metal powder, achieved by the injection molding machine according to the second embodiment. As illustrated in FIG. 9, an injection molding machine 12a according to the second embodiment includes a plurality of nozzles. The injection molding machine 12a injects the first metal powder 20 into a second mold 32a from both sides of the second mold 32a. The injection molding machine 12a also injects the second metal powder 30 into the second mold 32a from the center of the second mold 32a, at the same time as the first metal powder 20 is injected. With this processing, the injection molding machine 12a forms a mixed molded article 40a having the first molded article 24 on both ends, and the second molded article 34 at the center. The subsequent process is the same as that according to the first embodiment. The mixed molded article 40a according to the second embodiment may also have a shape in which the first molded article 24 is covered by the second molded article 34, in the same manner as in the first embodiment.

Figure 10:
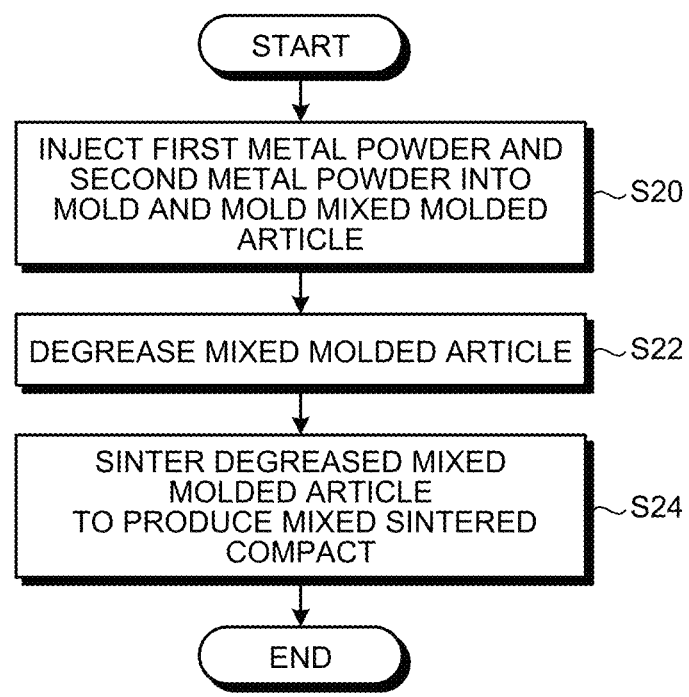
FIG. 10 is a flowchart for explaining a method for metal powder injection molding executed by the metal powder injection molding system according to the second embodiment.

The sequence of a method for metal powder injection molding, that is, the sequence by which the mixed sintered compact 50 is manufactured by the metal powder injection molding system 1 according to the second embodiment will now be explained. FIG. 10 is a flowchart for explaining a method for metal powder injection molding executed by the metal powder injection molding system according to the second embodiment.

As illustrated in FIG. 10, in the metal powder injection molding system 1, the injection molding machine 12a injects the first metal powder 20, with a binder added thereto, and the second metal powder 30, with a binder added thereto, into a mold, and forms the mixed molded article 40a (Step S20). Step S20 can be said to be the first injection molding step and the second injection molding step being performed simultaneously. The injection molding machine 12a injects the first metal powder 20 and the second metal powder 30 into the common second mold 32a, and forms the mixed molded article 40a. After the mixed molded article 40a is molded, in the metal powder injection molding system 1, the degreasing apparatus 14 degreases the mixed molded article 40a (Step S22), and then the sintering apparatus 16 sinters the degreased mixed molded article 40a, to produce a mixed sintered compact 50a (Step S24: the sintering step). The sequence is then ended.

The mixed sintered compact 50a manufactured in the second embodiment is also an injection-molded body of the metal powders having the same constituents. Therefore, even when the first injection molding step and the second injection molding step are carried out simultaneously, the method for metal powder injection molding enables a metal sintered compact endowed with functionally graded characteristics (mixed sintered compact 50a) to be manufactured appropriately. Furthermore, the process can be simplified by performing the first injection molding step and the second injection molding step simultaneously.

Some of the embodiments of the present invention are explained, but embodiments are not limited to these embodiments. Furthermore, the elements described above include those that can be easily thought of by those skilled in the art, those that are the substantially the same, and those falling within what is called the scope of equivalency. Furthermore, the elements described above may be combined as appropriate. Moreover, various omissions, substitutions, and modifications of the elements are still possible within the scope not deviating from the spirit of the embodiments described above.

REFERENCE SIGNS LIST

1 Metal powder injection molding system
10 Powder manufacturing apparatus
12 Injection molding machine
14 Degreasing apparatus
16 Sintering apparatus
20 First metal powder
21 First metal particle
22 First mold
24 First molded article
30 Second metal powder
31 Second metal particle
32 Second mold
34 Second molded article
40 Mixed molded article
50 Mixed sintered compact
52 First sintered portion
54 Second sintered portion

The invention claimed is:

1. A method for metal powder injection molding, comprising:
   injecting a first metal powder of a TiAl-based intermetallic compound into a mold, and molding the first metal powder through use of an injection molding machine;
   injecting a second metal powder of a TiAl-based intermetallic compound having a same constituent as the first metal powder and having a different average particle diameter from the first metal powder into a mold, and molding the second metal powder through use of the injection molding machine; and
   sintering molded articles obtained by molding the first metal powder and the second metal powder, and producing a mixed sintered compact in which a first sintered compact of the molded article obtained by molding the first metal powder and a second sintered compact of the molded article obtained by molding the second metal powder are integrated,
   wherein the mixed sintered compact is formed such that the second sintered compact covers an outer periphery of the first sintered compact, and
   a distance between a center of the mixed sintered compact and an outer periphery of the second sintered compact is equal to or greater than 0.5 times a distance between the outer periphery of the second sintered compact and the outer periphery of the first sintered compact, and equal to or smaller than 60 times the distance.

2. The method for metal powder injection molding according to claim 1, wherein injecting and molding the second metal powder is performed after injecting and molding the first metal powder.

3. The method for metal powder injection molding according to claim 2, wherein
   injecting and molding the first metal powder includes taking the molded article obtained by the molding out of the mold, and
   injecting and molding the second metal powder includes inserting the molded article obtained by molding the first metal powder into a mold that is different from the mold used at injecting and molding the first metal powder, and injecting the second metal powder onto a surface of the molded article in the different mold.

4. The method for metal powder injection molding according to claim 1, wherein injecting and molding the second metal powder is performed simultaneously with injecting and molding the first metal powder.

5. The method for metal powder injection molding according to claim 1, wherein
   an average particle diameter of the second metal powder is smaller than an average particle diameter of the first metal powder, and
   injecting and molding the second metal powder included injecting the second metal powder around the molded article obtained by molding the first metal powder.

6. The method for metal powder injection molding according to claim 1, wherein injecting and molding the second metal powder is performed prior to injecting and molding the first metal powder.

* * * * *